No. 797,122. PATENTED AUG. 15, 1905.
K. KIEFER.
FILTER PULP PACKING MACHINE.
APPLICATION FILED JUNE 12, 1905.
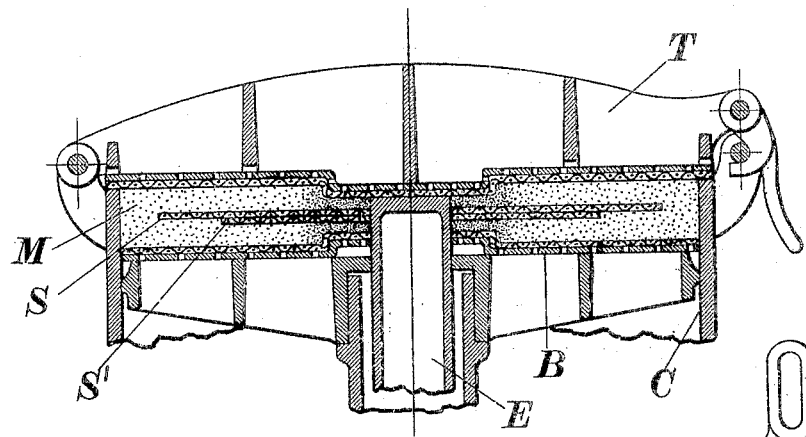
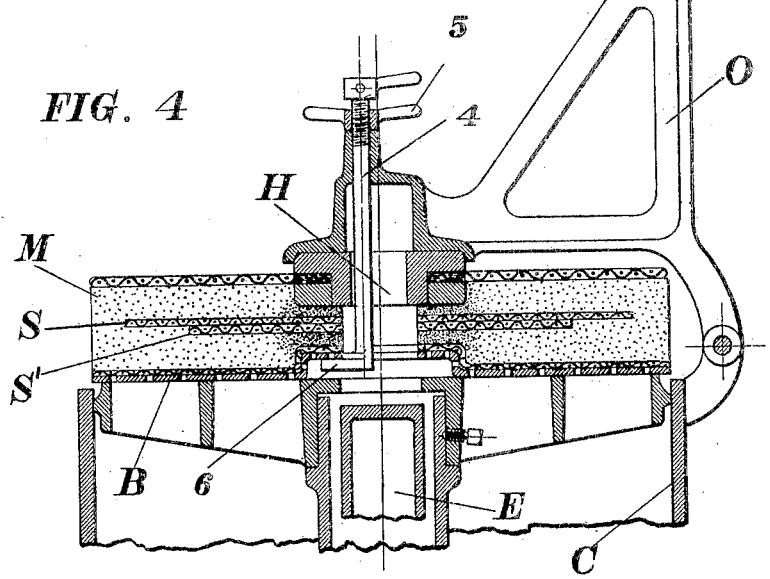
Witnesses.
G. W. Worden
E. J. Appleton
Inventor.
Karl Kiefer

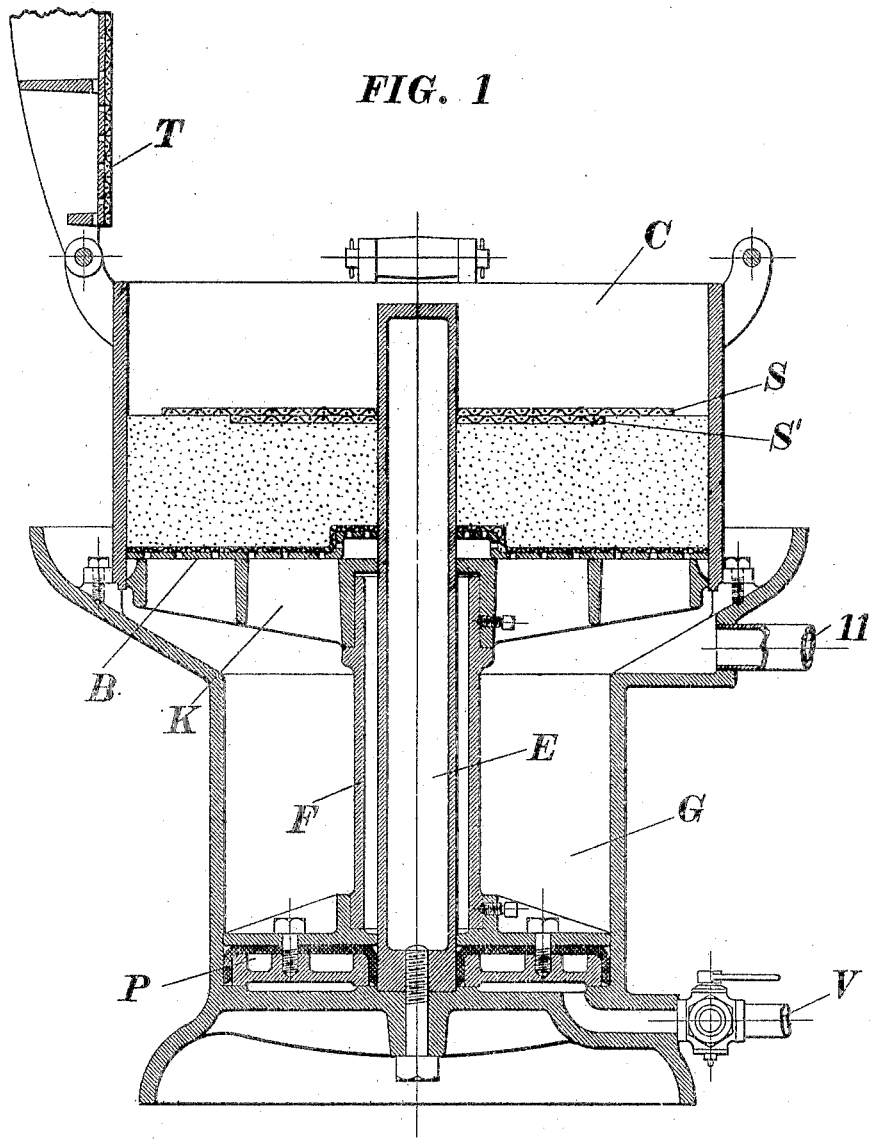

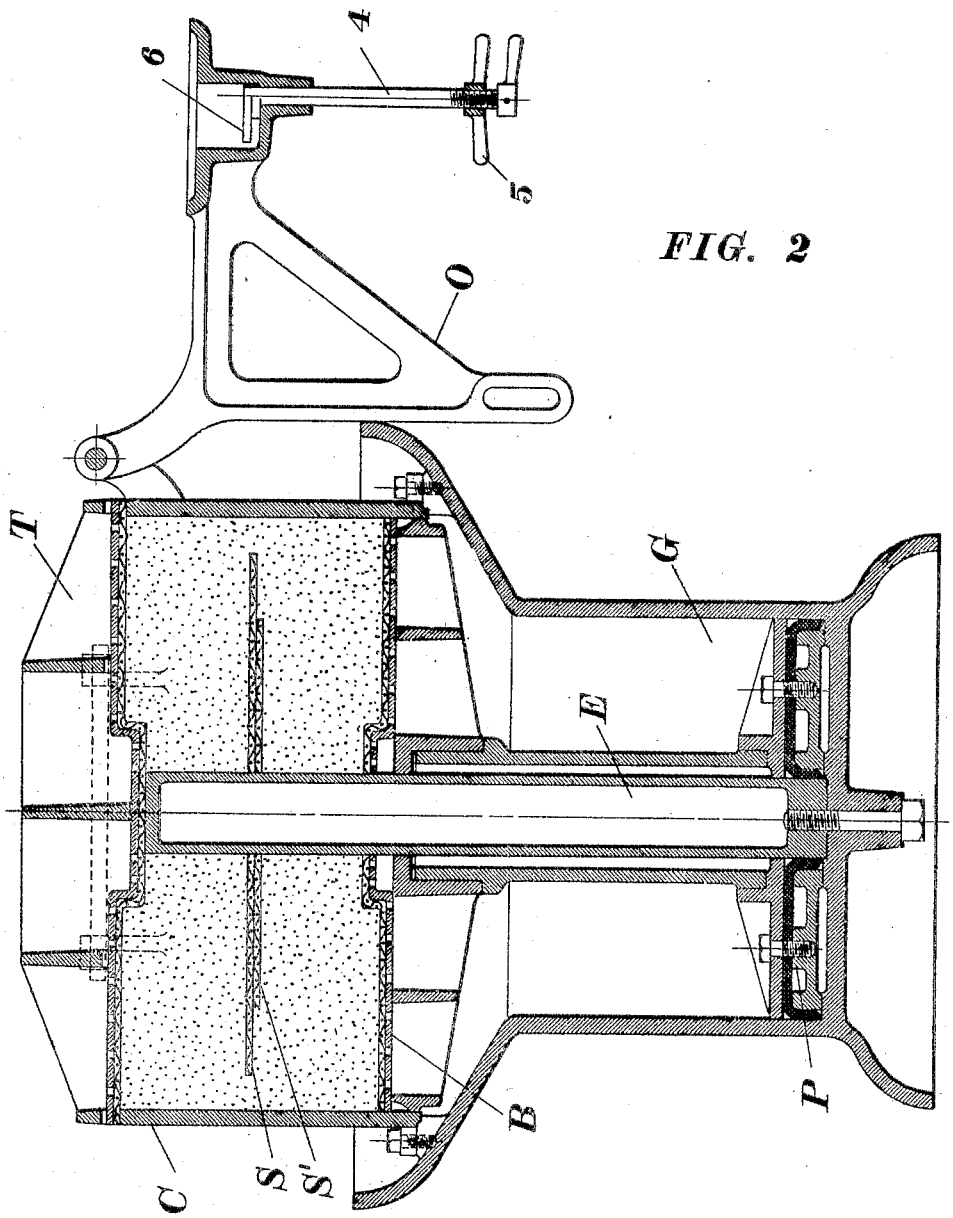

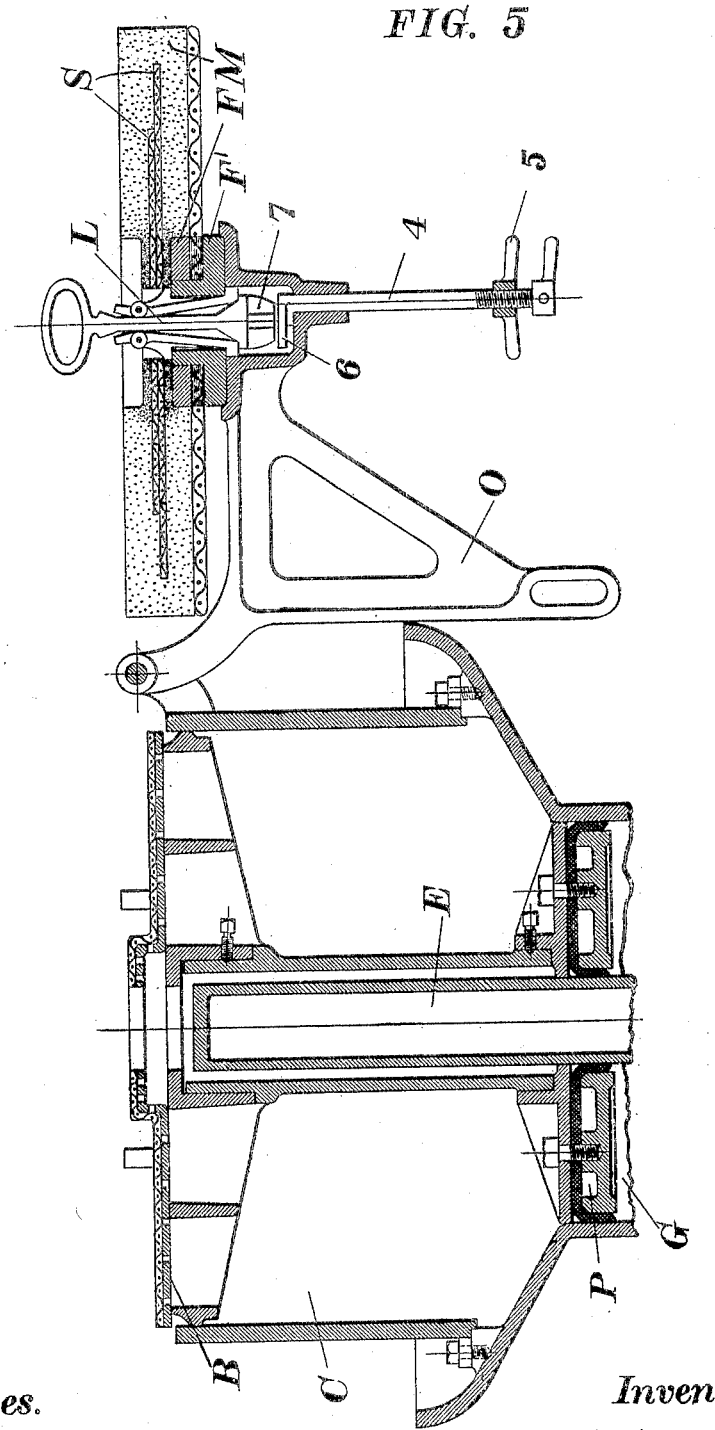

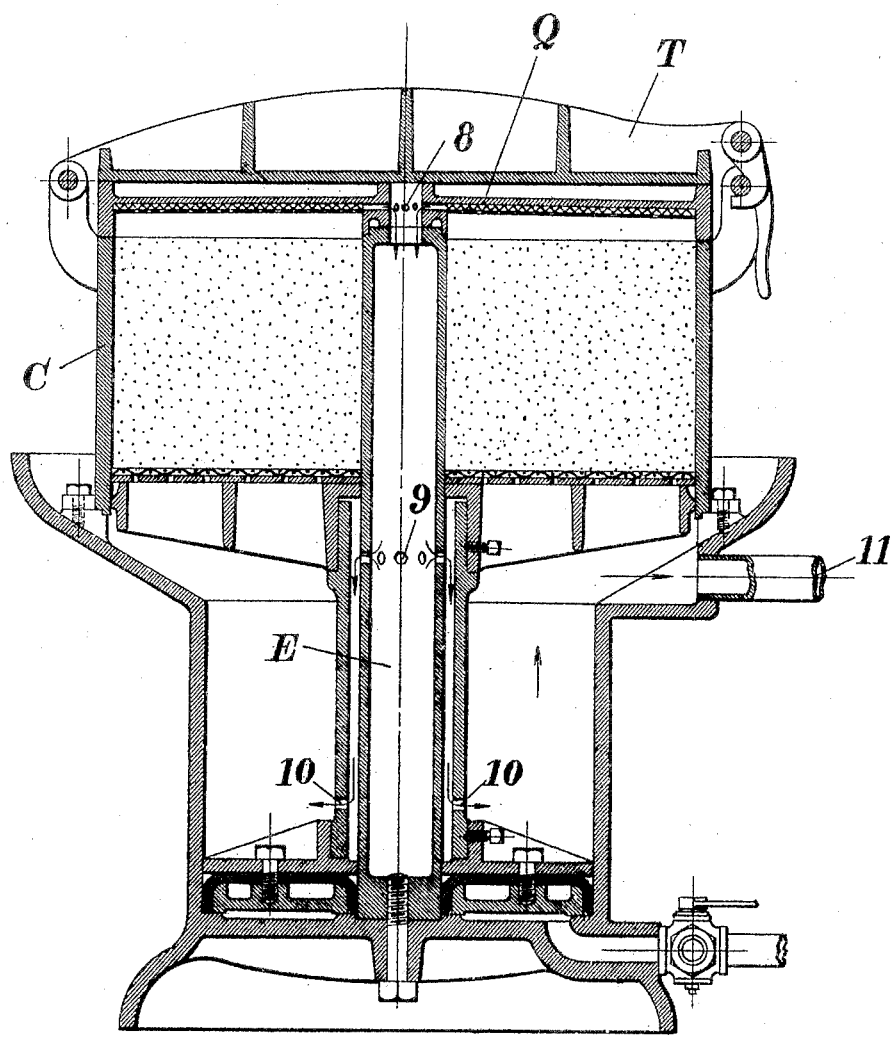

UNITED STATES PATENT OFFICE.

KARL KIEFER, OF CINCINNATI, OHIO.

FILTER-PULP-PACKING MACHINE.

No. 797,122.  Specification of Letters Patent.  Patented Aug. 15, 1905.

Application filed June 12, 1905. Serial No. 264,926.

*To all whom it may concern:*

Be it known that I, KARL KIEFER, a citizen of the United States, and a resident of Cincinnati, in the county of Hamilton and State of Ohio, have invented a new and useful Improvement in Filter-Pulp-Packing Machines, of which the following is a specification.

My improvement relates to improvements in filter-pulp-packing machines for the production of filter layers of freshly-compressed pulp for beer and wine filters—for instance, No. such as patented to me January 10, 1905, 779,607.

The object of this invention is to simplify and cheapen the construction of such packing-machines and to facilitate the packing of the filter layers.

Figure 1 shows a cross-section of this machine with the lid open and half the filter mass and a liquid-conductor placed therein. Fig. 2 shows the packing-machine closed with all the filter mass and liquid-conductor within it. Fig. 3 shows the top of the machine, showing the last stage of compression. Fig. 4 shows the newly-formed filter element raised above the packing-machine and ready for reversing. Fig. 5 shows the filter element reversed by means of the mechanism attached, ready to be taken from the packing-machine. Fig. 6 is a modification of the packing-machine adapted to pack a different style of liquid-conductor.

"Liquid-conductor" I will call the device necessary to form the immediate conduits for the liquid for supplying or draining disk-shaped filter layers. As a rule they are flat metal constructions of perforated plates and gauze, or, as patented to me in my above-mentioned patent, woven-wire screens only. In this present application the outlet liquid-conductor, as shown in Fig. 3, is composed of two fiber-retaining copper screens S and S', each one only about one-sixteenth of an inch thick. One may be a little smaller in diameter than the other one, or they may be of like size, or only one such screen may be used.

The packing-machine proper consists of an exterior stationary cylinder C, a hydraulic cylinder G, that forms the framework for the machine at the same time, and hydraulic piston P, carrying by means of the hollow column F a press-plate K. Presser-plate K moves with a nice fit within the cylinder C. The tube E is fastened to the base of the hydraulic cylinder G, and the hydraulic piston P is tightened against the interior cylinder E and the exterior cylinder G by means of cup-leathers. A three-way cock V supplies the press water or air and serves also as the outlet.

T is a hinged cover carrying the perforated plate covered with wire-gauze. The press-plate K also carries loose a similar perforated plate covered with wire-gauze.

The operation of the machine is as follows: To produce the filter elements, as shown in cross-section in Fig. 5 in the right-hand part of the drawings, half of the filter mass is dumped into the machine in diluted condition, and the light liquid-conductor, consisting of screens S and S', is thrown over the interior cylinder E. For this purpose S and S' have a central hole, so that they fit snugly around the cylinder E. Then the remaining half of the filter mass is thrown over it, properly distributed, if necessary, and the cover closed, as shown in Fig. 2. Thereupon the press-water is turned on at V and the paper mass compressed to a stage, as shown in Fig. 3. If the perforated plate B and also the perforated plate attached to the cover have central and ring-shaped projecting flanges, as shown in the drawings, it is seen, as shown in Figs. 3, 4, and 5, that the filter mass will be more compressed at the center than at any other part, as shown by the increased number of dots. The filter element proper, consisting now only of the light and pliable liquid-conductors S and S' and the mass M, would be difficult to remove with its surrounding filter mass without breaking or distributing the newly-compressed mass. In order to transport it, I therefore raise it above the level of the exterior cylinder C until I can catch by means of the hand the plate B, whereupon it can be carried away upon plate B, or if other liquid-conductors of the kind as shown in Fig. 4, consisting of strong wire-cloth and a central hub, are used I may put same on top, as shown in Fig. 4, and reverse the whole filter element, clutching by means of the clutch arrangement 4, 5, and 6 the press-plate B and reversing it by means of the lever O into the position as shown in Fig. 5.

The clutch arrangement consists of a strong pin 4, lock-nuts 5, and an eccentric finger 6. The working is easily visible from the detailed drawings. After the element is reversed, as shown in Fig. 5, the perforated plate B is put in its place again and the filter element may be removed by the lifting-tool L. (Shown in Fig. 5.)

Fig. 6 shows a modification of the press arranged for packing pan-filter plates, such as patented to me in my Patent No. 579,586, March 30, 1897, or similar. The press is arranged in such a manner that the filter-pan is interposed between the stationary cylinder C, interior cylinder E, and the hinged cover T. All the mass necessary for the element is thrown into the packing-machine same as before, whereupon the filter-pan Q, in an inverted position, is placed on top and centered by the tube that enters into central projections of the filter element Q. The cover T thereupon is closed and the hydraulic-press arrangement operated. The mass is pressed against the filter elements from underneath, adhering well enough thereon so it can be removed and reversed. The press-water escapes through the central opening 8 at the top of the tube E, as indicated by the arrows, from there through the holes 9 farther below, from there through the holes 10 of the piston-column, and then through the opening 11 in the frame-casting. It is not necessary when using such plates that the swing-cover should be porous. As indicated, it may be solid, but it may also consist of an open frame.

What I claim as my invention, and desire to secure by Letters Patent, is—

1. In a filter-pulp-packing machine, the combination of an exterior stationary cylinder, of a stationary central cylinder, a porous bottom moving longitudinally and snugly fitting into the ring-shaped space between the two cylinders, and a removable cover.

2. In a filter-pulp-packing machine, the combination of an exterior stationary cylinder, of a stationary central cylinder, a porous bottom moving longitudinally and snugly fitting into the ring-shaped space between the two cylinders, and a removable porous cover.

3. In a filter-pulp-packing machine, the combination of an exterior stationary cylinder, of a stationary central cylinder, a porous bottom moving longitudinally and snugly fitting into the ring-shaped space between the two cylinders, a removable cover and a liquid-conductor between bottom and cover.

4. In a filter-pulp-packing machine, the combination of an exterior stationary cylinder, of a stationary central cylinder, a porous bottom moving longitudinally and snugly fitting into the ring-shaped space between the two cylinders, a removable cover and a liquid-conductor within the exterior cylinder, cover and bottom.

5. In a filter-pulp-packing machine, the combination of an exterior stationary and non-porous cylinder, a central and stationary cylinder, a framework upon which both cylinders are fastened, a hydraulic and ring-shaped piston with a central opening, carrying a filter-mass-pressing plate with a removable open-work disk, a cover removable so as to gain access to the interior of the stationary cylinder and to insert the liquid-conductor.

6. In a filter-pulp-packing machine, the combination of an exterior cylinder, an interior cylinder much smaller in diameter, a liquid-conductor longitudinally movable on one of said cylinders and spaced apart from the other, a bottom part movable in relation to said cylinders, and a cover that can be removed to gain access into the interior of the exterior cylinder.

7. In a filter-pulp-packing machine, a filter-layer-reversing mechanism, consisting of a frame part, revoluble one hundred and eighty degrees relative to a supporting-point, a clamping mechanism adapted to take hold of the bottom press-plate of the packing-machine during the act of reversing, and release it again for the purpose of the removal of the filter layers.

8. In a filter-pulp-packing machine, the combination with a filter-layer-press mechanism proper, of a reversing mechanism having a frame part fulcrumed in a horizontal plane near the top of the machine, having a clamping arrangement adapted to take hold of the press-plate of the packing-machine, filter layer, liquid-conductor and auxiliary press-plate, and adapted to move one hundred and eighty degrees around the fulcrum of the frame.

In testimony whereof I have signed my name to this specification in the presence of two subscribing witnesses.

KARL KIEFER.

Witnesses:
  G. W. WERDEN,
  E. J. APPLETON.